United States Patent
Shah et al.

(10) Patent No.: US 10,685,374 B2
(45) Date of Patent: Jun. 16, 2020

(54) EXPLORATION FOR SEARCH ADVERTISING

(71) Applicant: Yahoo Holdings, Inc., Sunnyvale, CA (US)

(72) Inventors: Parikshit Shah, Emerald Hills, CA (US); Ming Yang, Sunnyvale, CA (US); Sachidanand Alle, Sunnyvale, CA (US); Adwait Ratnaparkhi, San Jose, CA (US); Ben Shahshahani, Menlo Park, CA (US); Rohit Chandra, Sunnyvale, CA (US)

(73) Assignee: Oath Inc., New York, NY (US)

( * ) Notice: Subject to any disclaimer, the term of this patent is extended or adjusted under 35 U.S.C. 154(b) by 268 days.

(21) Appl. No.: 15/702,150

(22) Filed: Sep. 12, 2017

(65) Prior Publication Data
US 2019/0080348 A1 Mar. 14, 2019

(51) Int. Cl.
*G06Q 30/02* (2012.01)
*G06F 17/18* (2006.01)
*G06F 16/951* (2019.01)

(52) U.S. Cl.
CPC ....... *G06Q 30/0244* (2013.01); *G06F 16/951* (2019.01); *G06F 17/18* (2013.01); *G06Q 30/0243* (2013.01); *G06Q 30/0246* (2013.01); *G06Q 30/0277* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 2005/0144067 A1* | 6/2005 | Farahat | ........... | G06Q 30/02 705/14.52 |
| 2006/0282328 A1* | 12/2006 | Gerace | ........... | G06Q 10/10 705/14.66 |
| 2009/0132340 A1* | 5/2009 | Demir | ........... | G06Q 30/02 705/7.29 |
| 2009/0171749 A1* | 7/2009 | Laruelle | ........... | G06Q 30/02 705/14.52 |
| 2009/0265227 A1* | 10/2009 | Langford | ........... | G06Q 30/02 705/14.45 |
| 2010/0332319 A1* | 12/2010 | Etchegoyen | ........... | G06Q 30/02 705/14.49 |
| 2013/0080264 A1* | 3/2013 | Umeda | ........... | G06Q 30/02 705/14.69 |

(Continued)

OTHER PUBLICATIONS

D. Agarwal et al., Online models for content optimization, in Advances in Neural Information Processing Systems 21, pp. 17-24, Curran Associates, Inc., 2009.

(Continued)

*Primary Examiner* — Vincent M Cao
(74) *Attorney, Agent, or Firm* — Cooper Legal Group, LLC

(57) ABSTRACT

A system and method enable exploration of cold ads in an online information system. Cold ads are ads that are new to the system and do not yet have reliable click through rate (CTR) estimates or click probabilities. The method and system selectively boost the click probabilities of cold ads to increase their likelihood of participating in and winning an auction so that the cold ad get more impressions, but without adversely affecting revenue in a production environment when cold ads are introduced.

19 Claims, 4 Drawing Sheets

(56) References Cited

U.S. PATENT DOCUMENTS

2015/0088636 A1* 3/2015 Armon-Kest ......... G06F 16/215
                                                    705/14.43
2017/0083522 A1   3/2017 Somekh et al.

OTHER PUBLICATIONS

S. Agrawal and N. Goyal, Thompson sampling for contextual bandits with linear payoffs, in Proceedings of the 30th International Conference on Machine Learning, ICML 2013, Atlanta, GA, USA, Jun. 16-21, 2013, pp. 127-135, 2013.

P. Auer, Using confidence bounds for exploitation-exploration trade-offs, J. Mach. Learn. Res., 3:397-422, Mar. 2003.

O. Chapelle and L. Li, an empirical evaluation of thompson sampling, in Advances in Neural Information Processing Systems 24, pp. 2249-2257, Curran Associates, Inc., 2011.

O. Chapelle and Y. Zhang, A dynamic bayesian network click model for web search ranking, in Proceedings of the 18th International Conference on World Wide Web, WWW '09, pp. 1-10, 2009.

H. Cheng and E. Cantu-Paz, Personalized click prediction in sponsored search, in Proceedings of the Third ACM International Conference on Web Search and Data Mining, WSDM '10, pp. 351-360, New York, NY, USA, 2010, ACM.

D. Silver et al., Mastering the game of go with deep neural networks and tree search, Nature, 529(7587):484-489,01 2016.

L. Li, W. Chu, J. Langford, and R. E. Schapire, A contextual-bandit approach to personalized news article recommendation, in Proceedings of the 19th International Conference on World Wide Web, WWW '10, pp. 661-670, ACM, 2010.

W. Li, X. Wang, R. Zhang, Y. Cui, J. Mao, and R. Jin, Exploitation and exploration in a performance based contextual advertising system, in Proceedings of the 16th ACM SIGKDD International Conference on Knowledge Discovery and Data Mining, KDD '10, pp. 27-36, New York, NY, USA, 2010, ACM.

* cited by examiner

EXPLORATION FOR SEARCH ADVERTISING

BACKGROUND

The present application relates generally to the field of online advertising. More particularly, the present application relates to the field of exploration for search advertising.

A content delivery system operates to provide items of content to users accessing online resources over a network such as the internet. Online resources include web sites and web pages provided over the network to a user device of a user. Online content includes text, graphics, images, video and other information communicated with a web page by a web site to the user. The content delivery system may provide the online content in response to a search query received from the user.

The content delivery system endeavors to provide most relevant content to a user. Most relevant content is the content or advertising most likely to cause the user to interact with the content. Interaction may be by clicking on a content item, taking some action such as making an online purchase or providing a credit card number, or merely viewing a content item provided by the content delivery system.

Advertisements are ranked and selected based on expected revenue produced for an advertiser associated with the advertisement. Expected revenue may be referred to as expected cost per mille, or eCPM, referring to the expected cost per one thousand impressions delivered for the advertisement. Expected revenue for an advertisement is typically calculated as a product of a bid amount and a click probability. The bid amount is the amount the advertiser associated with the advertisement agrees to pay when an end user sees the advertisement on a web page and clicks on the advertisement. The bid amount is set by the advertiser. The operator of the content delivery system has control over the click probability. This makes developing an accurate estimation of initial click probability an important matter for the operation of the content delivery system. However, in the case of advertisements newly placed in the system, it may be difficult to determine accurately the initial estimation of click probability. Without an accurate estimate of click probability, a new advertisement may receive very few impressions which makes it difficult for the system to increase accuracy of the estimate of click probability over time. The content delivery system seeks to optimize advertising for revenue.

The content delivery system selects content for delivery to the system based on factors such as experience with the content item or user, or information known about the user's demographics or interests, for example. Similarly, the content delivery system selects advertisements based on eCPM. The selected content items and advertisements are placed on a web page and sent to the end user in response to a query from the end user.

One problem encountered by a content delivery system is the cold start problem. When the content delivery system injects new content (or advertisements) into the system, the new content is referred to as cold content, meaning content with which the content delivery system has little or no experience by which to estimate its likely performance. The cold content must compete with other, warmer content, meaning content with which the content delivery system has at least some experience with user reaction to the content. The cold start problem refers to the problem of the content delivery system learning about the quality of the new content and to subsequently deliver it reliably and appropriately. The coldness of the cold content prevents the system from producing an accurate estimate of the click through probability.

It is desirable for an online provider operating a content delivery system to provide a system and method for addressing the cold start problem. For the online provider, addressing this problem will enable providing desirable content and advertising to a user. Moreover, addressing this problem by an online provider can operate to further engage advertisers for their mutual benefit. Further limitations and disadvantages of conventional and traditional approaches will become apparent to one of skill in the art, through comparison of such systems with some aspects of the disclosure set forth in the remainder of the present application with reference to the drawings.

DETAILED DESCRIPTION

Figure 1:
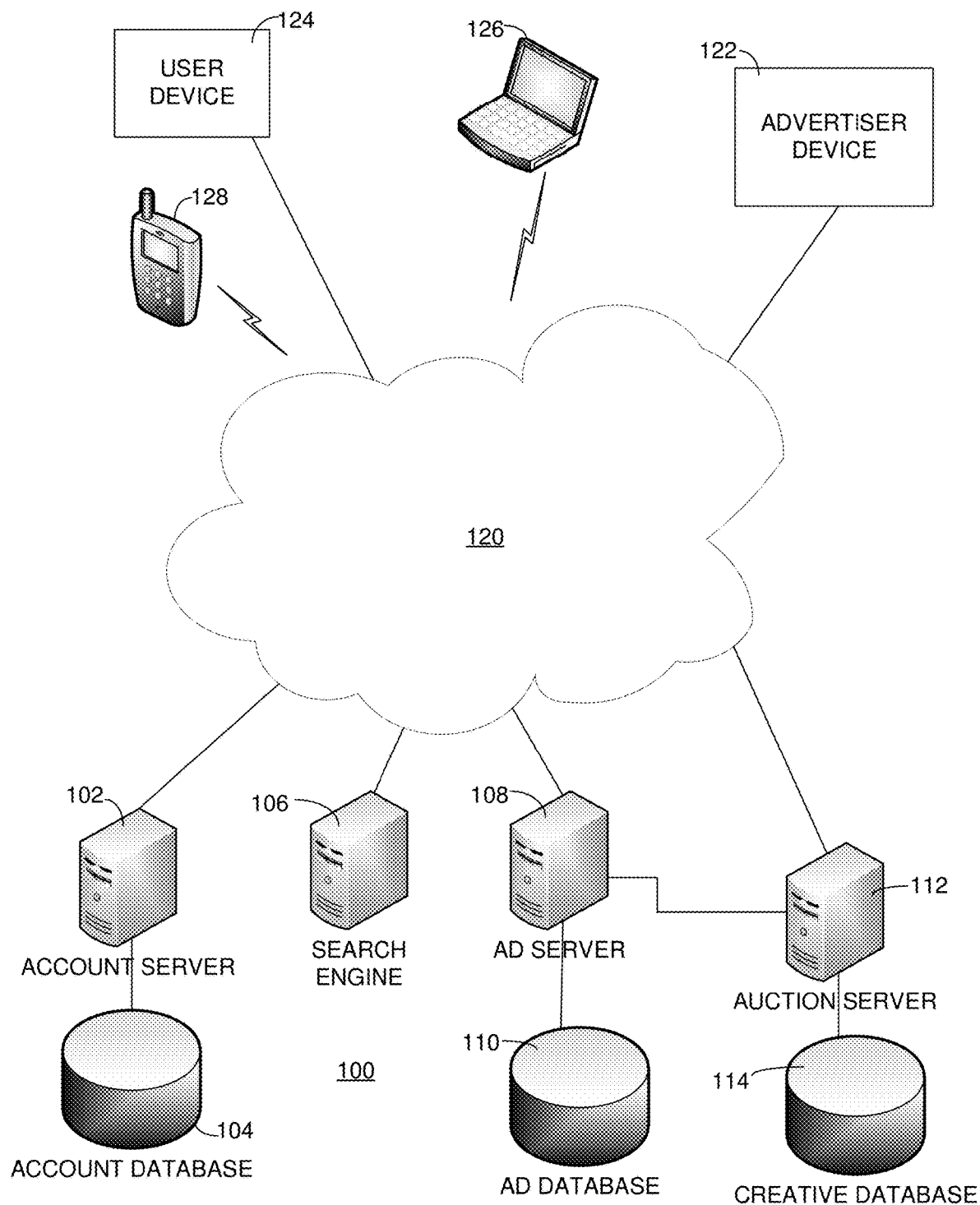
FIG. 1 is a block diagram of an example online information system.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

An online information system places advertisements of advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements. The content of the advertisements themselves is sometimes referred to as advertising creative or advertising creatives.

Search advertising is a method of placing relevant online advertisements on web pages that show results from search engine queries. Search advertising has become an important part of the online user experience for users viewing web pages. Such web pages typically include content of interest to a user as well as advertising. An online resource such as a server may select the content and advertising because of a search query submitted by the user to a search engine or other online resource. Search advertising is an extremely attractive proposition for advertisers because the search query provides a powerful relevance signal that the advertiser can use for targeting only the most appropriate advertising (or advertisements or ads) for the user. Conceptually, a typical search advertising system may consist of the several components.

A first component of a search advertising system is a campaign management system. A campaign management system includes an inventory of advertisements or advertising creatives. Each advertisement includes data or other information defining the advertising creative, along with associated information defining a title, description, and search keywords for the advertisement. The search keywords define eligibility for display of the advertisement when the search query matches or is similar to the search keyword. Each advertiser creative also has associated with it a bid. Importantly, the advertisers introduce new advertisements into the campaign management system periodically.

A second component of a search advertising system is a matching system. The matching system is responsible for understanding a received search query and retrieving relevant ads from the campaign management system that match the query or the context of the query.

A third component of a search advertising system is a click-model. The click-model reports an estimate of the probability of a click for an ad a, in the context of a query q by a user u, denoted by $p_{q,a,u}$. Each element of the triple (q,a,u) can be further expanded into more detailed features. For example, the query can be broken down into tokens and characters. The advertisement may be associated to a particular domain, a particular campaign, and a particular ad-group, and has title and description features. Lastly, the user information may contain data defining a bcookie, location, time, gender, internet protocol (IP) address type, etc., which are, used as training inputs to the model.

A fourth component of a search advertising system is an auction component. The auction determines the final selection of creatives to display on a web page to a user. This include the relative page positions, and the price-per-click for each advertisement on the web page. Search revenue received by an online system operate is often click driven. That is, an ad is only monetized if, upon display, the user clicks the ad. Other monetization systems operate on a cost per impression basis or a cost per action basis. In a cost per click system, the auction component uses both the bid as well as the click probability in determining a rank-score for selection or ranking of final ads sent on a web page to a user. The most commonly used rank-score is the product of the bid and the estimated click-probability.

One existing challenge in the context of search advertising is referred to as the cold-ad problem. A cold ad refers to an advertising creative that is introduced by an advertiser which has relatively few or no historical impressions. A brand new ad creative, with no historical impressions, is a frozen ad. The cold ad problem is actually a two-fold problem:

First, when the ad is cold and has insubstantial historical impressions, many of the ad-specific features are unknown and thus inaccurately learnt. Thus, the predicted click through rate (CTR) of the ad, designated $p_{q,a,u}$, is not accurate and can affect the performance of this creative in adverse ways. This in turn can cause the overall system to behave sub-optimally, either showing poor quality new ads or showing stale ones repeatedly in favor of new, better quality ads.

Second, when a new ad is introduced by an advertiser, the intent is for the ad to gain impression volume. However, due to the predicted CTR being inaccurate, some new ads may be under-predicted and fail to gain impression volume. As noted above, the most commonly used rank-score is the product of the bid and the estimated click-probability. If the auction component underestimates the click-probability, the ad will be less likely to be shown to users on web pages.

FIG. 1 is a block diagram of online information system 100. The online information system 100 in the exemplary embodiment of FIG. 1 includes an account server 102, account database 104, a search engine 106, an advertisement (ad) server 108, an ad database 110, an auction server 112 and a creative database 114. The online information system 100 may be accessible over a network 120 by one or more advertiser devices such as advertiser device 122 and by one or more user devices such as user device 124. In various examples of such an online information system, users may search for and obtain content from sources over the network 120. Advertisers may provide advertisements for placement on web pages and other communications sent over the network to user devices such as the user device 124. The online information system in one example is deployed and operated by an online provider such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account management server 102. Examples include advertiser identification information, advertiser security information such as passwords and other security credentials, and account balance information. In some embodiments, an online provider which manages the online information system 100 may assign one or more account managers to a respective advertiser, and information about the one or more account managers may be maintained in the account database 104 as well as information obtained and recorded for subsequent access by an account manager.

The account server 102 may be implemented using any suitable device. The account management server 102 may be implemented as a single server, a plurality of servers, or any other type of computing device known in the art. Preferably, access to the account server 102 is accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. In one particular embodiment, the advertiser front end is accessible as a web site with one or more web pages that an accessing advertiser may view on an advertiser device such as advertiser device 122. The advertiser may view and edit account data using the advertiser front end. After editing the advertising data, the account data may then be saved to the account database 104.

The search engine 106 may be a computer system, one or more servers, or any other computing device known in the art. Alternatively, the search engine 106 may be a computer program, instructions, or software code stored on a tangible, non-transitory, computer-readable storage medium that runs on a processor of a single server, a plurality of servers, or any other type of computing device known in the art. The search engine 106 may be accessed, for example, by user devices such as the user device 124 operated by a user over the network 120. The user device 124 communicates a user query to the search engine 106. The search engine 106 locates matching information using any suitable protocol or algorithm and returns information to the user device 124. The search engine 106 may be designed to help users find information located on the Internet or an intranet. In a particular example, the search engine 106 may also provide to the user device 124 over the network 120 a web page with content including search results, information matching the context of a user inquiry, links to other network destinations or information and files of information of interest to a user operating the user device 124.

The search engine 106 may enable a device, such as the user device 124 or any other client device, to search for files of interest using a search query. Typically, the search engine 106 may be accessed by a client device via one or more servers or directly over the network 120. The search engine 106 may, for example, in one illustrative embodiment, comprise a crawler component, an indexer component, an index storage component, a search component, a ranking component, a cache, a profile storage component, a logon component, a profile builder, and one or more application program interfaces (APIs). The search engine 106 may be deployed in a distributed manner, such as via a set of distributed servers, for example. Components may be duplicated within a network, such as for redundancy or better access.

The ad server 108 operates to serve advertisements to user devices such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or any access.

For online information providers, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior.

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Yet another approach includes targeting based on content of a web page requested by a user. Advertisements may be placed on a web page or in association with other content that is related to the subject of the advertisements. The relationship between the content and the advertisement may be determined in any suitable manner. The overall theme of a particular web page may be ascertained, for example, by analyzing the content presented therein. Moreover, techniques have been developed for displaying advertisements geared to the particular section of the article currently being viewed by the user. Accordingly, an advertisement may be selected by matching keywords/and or phrases within the advertisement and the web page.

The ad server 108 in some embodiments implements a matching system and a click-model. As noted above, the matching system includes logic and data operative to parse and understand a query received from a user device such as user device 124 and to retrieve all relevant ad from the ad database 110 that match the query in a specified manner. The click-model includes logic and data operative to develop an estimate of the probability of a click for an $ad_a$ from the ad database 110, in the context of a $query_q$ received from a $user_u$ operating the user device 124 and denoted by $p_{q,a,u}$.

The ad server 108 includes logic and data operative to format the advertisement data for communication to the user device. The ad server 108 is in data communication with the ad database 110. The ad database 110 stores information including data defining advertisements to be served to user devices. This advertisement data may be stored in the ad database 110 by another data processing device or by an advertiser.

Further, the ad server 108 is in data communication with the network 120. The ad server 108 communicates ad data and other information to devices over the network 120. This information may include advertisement data communicated to a user device. This information may also include advertisement data and other information communicated with an advertiser device such as the advertiser device 122. An advertiser operating an advertiser device 122 may access the ad server 108 over the network to access information including advertisement data. This access may include developing advertisement creatives, editing advertisement data, deleting advertisement data and other activities.

The ad server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to the ad database 110 for subsequent communication in advertisements to a user device.

The advertisement server 108 may be a computer system, one or more servers, or any other computing device known in the art. Alternatively, the advertisement server 108 may be a computer program, instructions and/or software code stored on a tangible, non-transitory computer-readable storage medium that runs on a processor of a single server, a plurality of servers, or any other type of computing device known in the art.

The auction server 112 forms one embodiment of an auction component of the online information system 100. The auction server 112 is in data communication with the creative database 113 and the ad server 108. The auction server 112 operates in conjunction with the ad server 108 to select one or more advertising creatives from the creative database 114 to place on a web page to be communicated by the ad server 108 to the user device 124. The auction server 112 determines the final selection of advertising creatives to be displayed on the web page, their relative page positions and the price per click or other pricing information for each creative. In one embodiment, the auction server 112 sets a rank score for the creative using a product of a bid price set by the advertiser associated and an estimated click probability for the creative.

The account server 102, the search engine 106, the ad server 108, and the auction server 112 may be implemented as any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The account server 102, the search engine 106, the ad server 108, and the auction server 112 may be implemented as content servers or may be in communication with content servers. A content server may include a device that includes a configuration to provide content via a network to another device. A content server may, for example, host a site, such as a social networking site, examples of which may include, without limitation, Flicker®, Twitter®, Facebook®, LinkedIn®, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device which may access the online information system 100 over the network 120. The advertiser device 122 is operative to interact over the network 120 with the account server 102, the search engine 106, the ad server 108, content servers and other data processing systems. The advertiser device 122 may, for example, implement a web browser for viewing web pages and submitting user requests. The advertiser device 122 may communicate data to the online information system 100, including data defining web pages and other information. The advertiser device 122 may receive communications from the online information system 100, including data defining web pages and advertising creatives.

The user device 124 includes any data processing device which may access the online information system 100 over the network 120. The user device 124 is operative to interact over the network 120 with the search engine 106. The user device 124 may, for example, implement a web browser for viewing web pages and submitting user requests. A user operating the user device 124 may enter a search request and communicate the search request to the online information system 100. The search request is processed by the search engine and search results are returned to the user device 124. In other examples, a user of the user device 124 may request data such as a page of information from the online information processing system 100. The data instead may be provided in another environment such as a native mobile application, TV application, or an audio application. The online information processing system 100 may provide the data or re-direct the browser to another web site. In addition, the ad server may select advertisements from the ad database 110 and include data defining the advertisements in the provided data to the user device 124.

The advertiser device 122 and the user device 124 operate as client devices when accessing information on the online information system. A client device such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, a laptop computer 126 and a smartphone 128 may be operated interchangeably as an advertiser device or as a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device such as the advertiser device 122 and the user device 124 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

Cold Content

An advertiser may use the ad server 108 in combination with the advertiser device 122 to develop advertising creatives and place the advertising creatives in the online information system 100. Initially, a new ad creative lacks impressions which can be used to determine the quality of the ad creative. Such a new ad creative may be referred to as cold content. From the advertiser's perspective, the most serious consequence is a lack of impression volume of the cold ad. In a typical scenario, an advertiser introduces a new creative as part of an existing campaign, or a new campaign altogether. However, the creative in question fails to get impression volume for one or more of the following reasons.

Ad-Quality Filtering (AQF). In order to maintain a certain minimum quality of content displayed online, ads deemed low-quality in the context of a query are often filtered out and made ineligible for the auction. Thus, regardless of the bid on such a creative, the auction component may filter the ad if its quality score is too low. The primary quality score currently used within the system is the predicted click probability $p_{q,a,u}$. Thus, if for a cold ad $p_{q,u,a}$ is below a threshold $t_{AQF}$, the cold ad will be blocked from gaining impression volume for that query and user combination.

Reserve Price. Regardless of the presence of other competing ads, every advertisement must clear a particular reserve price in the auction in order to obtain impressions. For example, the auction component may require that the product of a bid associated with an advertisement and the predicted CTR associated with the advertisement must be above a certain threshold denoted by $t_{reserve}$. If the creative falls below this monetization threshold, the auction component deems the creative to be not worth the adverse user experience in monetary terms created by the introduction of the ad on the search page.

Auction. The auction component can block an advertising creative from gaining impression volume because it competes in a deep-market query with many other ads with a higher rank-score. For instance, if no more than five ads are eligible for display on the search page, and there are at least five other ads with a higher score, determined for example as the product of bid and predicted CTR, the new creative will not gain impression volume.

An observation is that the above impediments to impression volume are all sensitive to the predicted CTR, $p_{q,a,u}$. Ad quality filtering directly depends on the predicted CTR, and the CTR is the only system related factor in the reserve price as well as the auction, since advertisers control the bids. Thus, if the auction component inaccurately predicts the CTR on cold ads, impression volume is directly impacted. Furthermore, a substantial volume of creatives returned by matching are cold, and thus the overall performance of the system depends on accurately predicting CTR on cold ads.

Figure 2:
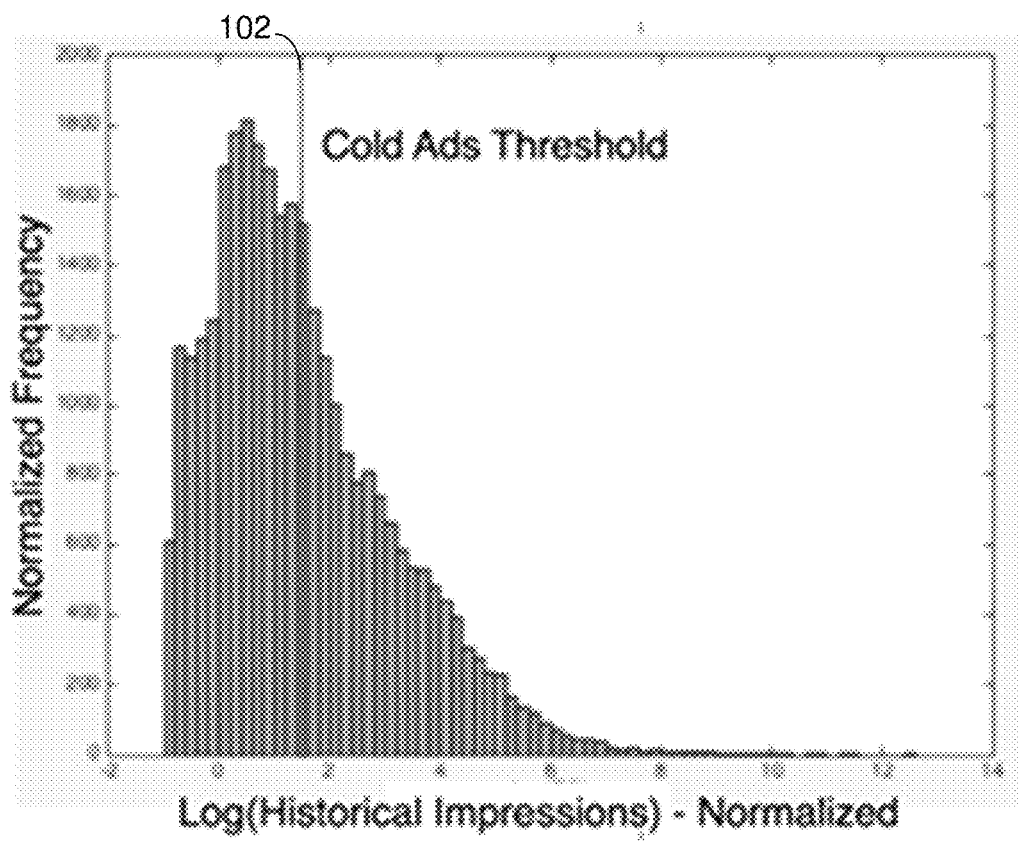
FIG. 2 is a histogram of number of historical impressions of ads.

FIG. 2 is a histogram illustrating the number of historical impressions of ads that are returned by an ad-matching system on a particular day of traffic. In FIG. 2, the x-axis corresponds to the number of historical impressions corresponding to ads, normalized for position effects, and rescaled. The y-axis corresponds to the frequency with which ads falling into the corresponding historical count buckets appear on that day. Ads to the left of the line 202 are considered cold ads. It can be seen that a substantial number of ads returned are cold, as evidenced by the skew of the histogram to the left of FIG. 2. This emphasizes the scope of the cold start problem. In other words, FIG. 2 shows a histogram of impression volume by coldness level, and indicates that a significant fraction of ads returned are cold or frozen. A frozen ad is one that has no impression history whereas a cold ad is one with very little impression history.

One existing click-model is a supervised feature-based model:

$$p(\text{click}|q,a,u) = p_{q,a,u} := F(f_j(q,a,u))$$

where $(f_j(q,a,u))_{j=1,\ldots,N}$ is the $j^{th}$ feature extracted for query q, ad a and user u, and F is chosen from a parametric function class (such as logistic regression or gradient boosted decision trees) and the parameters are selected by empirical loss minimization from historical data. The most important features of the model, including the features that largely determine the predicted click-probability, are the so called click-feedback features, also known as the EC/COEC features, where EC refers to an expectation that a user will click on a content item, and COEC refers to a normalized historic CTR (e.g., clicks over expected clicks).

EC features capture position-normalized impressions for the corresponding feature. The EC feature for a creative, denoted CRT-EC, is especially important for exploration since it counts the number of times (suitably normalized) the creative has been shown historically, thus forming a measure of how cold the ad is.

COEC features capture click information. The CRT-COEC is defined to be the number of historical clicks achieved by the creative ad in question normalized by the EC. CRT-COEC may serve as a proxy for the position-normalized historical CTR for that ad.

During training of the click-model, the click-model learns feature weights for each feature of the form described above. Accurate click prediction depends on the correct learning of feature weights. The feature weights for features that have occurred very few times in training are relatively unreliable. For instance, a creative that has only five impressions with a single click will learn a CTR-COEC weight such that the predicted CTR would be close to 0.2. However, if the click was an accidental click, and the true CTR was much closer to 0.02 and the learned weight would be substantially incorrect. A more extreme case is when the CRT in question has never been seen before. In such a case, the feature takes on a default value and the weight corresponds to the historical weight for all frozen CRTs. In this situation, if the CTR for the frozen ad is underpredicted, the CRT will not gain impression volume. This is an adverse condition for the advertiser. Consequently, the EC and COEC values will continue to remain incorrect and the click-model will never have an opportunity to learn the true CTR.

Figure 3:
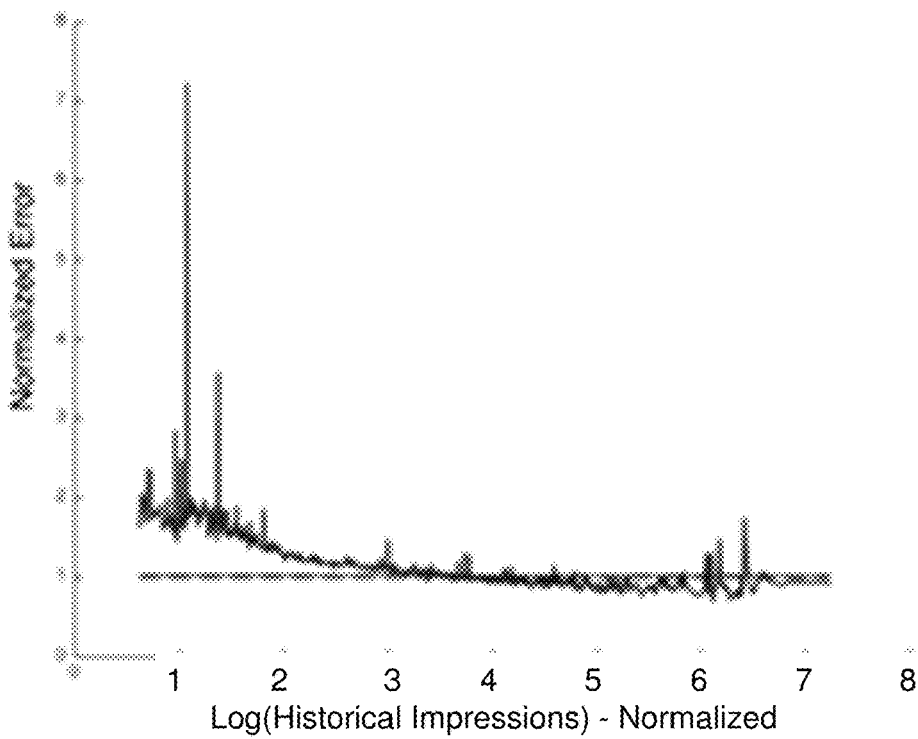
FIG. 3 shows click-prediction accuracy of ads as a function of the number of historical impressions of a creative.

FIG. 3 shows click-prediction accuracy of ads as a function of the number of historical impressions received by the corresponding creative. On the x-axis is the logarithm of the number of historical impressions, normalized for position effects and rescaled. The y-axis is a notion of error called the relative bias of the ad. It is evident that, for cold ads, the error is substantially worse than for warm ads. That is, FIG. 3 shows that predictions for cold ads are more inaccurate as compared to warm ads. Exploration is a crucial component for the long-term health of a search advertising system. Unless cold ads are impressed, the system cannot learn the features of the cold ads, and there is a danger that the system would keep showing stale ads. This may be bad not only for advertisers seeking volume for new, cold ads, but also suboptimal in terms of revenue and user experience for the overall system.

Intimately tied to the cold ads problem is a problem known as the exploration-exploitation tradeoff. In this context, the tradeoff is clear: any given query yields multiple ads competing in the auction with different rank-scores. The warm ads have a lower variance in the predicted CTR (and hence a lower variance in the rank-score). The cold ads have a higher variance. Exploitation would correspond to picking the safe option, i.e. warm ads with highest rank-scores. Exploration would correspond to picking the cold ads with none or few historical impressions, thereby discovering potentially new high-quality ads at the risk of also showing low-quality ads and thereby losing revenue.

Problems of this sort may be considered as multi-armed bandit problems. In this setting, the decision-maker is presented with the opportunity to select (or "pull") one (or more generally k) arms from a selection of n arms of a slot machine. In the present context, each arm is an ad. Each arm has a random reward with a fixed but unknown distribution. The objective of the decision-maker is to, over multiple rounds, maximize her expected reward. Once an arm is pulled (i.e. an ad is shown on a web page to a user on a user device), a reward from the distribution of the arm is realized, and the decision-maker may learn from this information. A pertinent modification of the multi-armed bandit problem is the contextual bandit problem. In this setting, each arm also presents a context or a feature vector. In the present context, the feature vector would correspond to the click-modeling features (i.e. information about the query, ad, and user).

Some methods for exploration-exploitation involve sequentially acting and learning statistics of the unknown arm distributions. For each arm, a prior distribution is assumed. At each stage, an action is performed (selection of arm i), a reward is obtained, and the posterior distribution (or some sufficient statistics) corresponding to the pulled arm i is updated. Most commonly, the prior is assumed to be normal and the main statistics that are tracked are the mean of the arm (i.e. $\hat{p}_i$ as well as the variance of the arms $\hat{\sigma}_i^2$). Some well-known approaches for the same include the following:

Thompson sampling: in this approach, the rewards are sampled from the posterior distribution and the arm with the maximum sampled reward is picked.

UCB: in this approach, the decision rule is to pick the arm with the highest expected reward plus a standard deviation (i.e. the upper confidence bound).

$\epsilon$-greedy: in this approach, exploration is only performed on a fraction $\epsilon$ of the rounds, either completely randomly, or as per one of the two above strategies.

In one embodiment, the UCB approach was adopted over the Thompson sampling based approach as a deterministic exploration approach is favored as opposed to a randomized one (sampling from posterior), both for computational reasons as well as ease of post-hoc analysis. In order to be conservative, the UCB approach may combined with an $\epsilon$-greedy approach where only a fraction of query sessions were made available for exploration (the other session were pure exploitation).

The following is one example implementation of the approach.

1: Input: query q, user u, ads $a_1, \ldots, a_m$, their corresponding click probabilities $p_1, \ldots, p_m$, their bids $b1, \ldots, b_m$, and their historical (position-normalized) impression counts $n_1, \ldots, n_m$, blacklist of ads B.

2: Parameters: $\epsilon$, the greed parameter; eligibility thresholds $p_{th}, n_{th}$ for the probability and coldness; $r_{max}$ the maximum number of arms that can be pulled in a single round of exploration; the boosting parameters $\alpha, \beta$.

3: $\epsilon$-Greedy: Sample from Bernoulli distribution $X \sim B(\epsilon)$. If $X=0$, send $F=\{(a_i, p_i)|i=1, \ldots, m\}$ to auction and return.

4: Let E=∅

5: Eligibility: For each i, if $p_i < p_{th}$ and $n_i < n_{th}$ and $a_i \notin B$, add $E = E \cup \{i\}$.

6: Bid-proportional sampling: From E sample $q = \min(|E|, r_{max})$ ads randomly with replacement with probability $$\Theta_j = \frac{b_j}{\sum_{k=1}^{|E|} b_k}.$$

Let the selected ads have indices $T = (i_1, \ldots, i_q)$.

7: Boosting: For each $j \in T$, $$\bar{p}_j := p_j \left(1 + \frac{\alpha}{\sqrt{\beta + n_j}}\right).$$

8: Form final set: Define $$F := \bigcup_{j \in T} \{(a_j, \bar{p}_j)\} \cup \bigcup_{k \in \backslash [m]} \{(a_k, p_k)\}$$

9: Output: Return F to the auction.

Some comments and implementation-related points follow.

In one embodiment, an ϵ-greedy strategy is chosen, wherein only an ϵ=0.05 fraction of query sessions are (randomly) chosen for exploration. One reason for this choice is to be conservative, and to perform exploration in a low-risk, revenue neutral manner. Furthermore, the impression volume is large enough that with ϵ=0.05, an effective amount of exploration is achieved.

Some limits may be implemented with respect to eligibility. That is, when a query session is activated for exploration, a number of ads are returned by matching for consideration and exploration. In some embodiments, not all of these ads are made eligible for exploration. Ads that have sufficient historical impression volume (i.e., warm ads) have a reliable predicted CTR, and there is no need to explore these ads. We choose the threshold nth, by plotting the accuracy as a function of historical impressions. The value is chosen to be $n_{th}$ set equal to 500 in one exemplary embodiment. Also, some embodiments do not explore cold ads whose predicted CTR is under a certain threshold. For example, the value may be chosen to be the one corresponding to the AQF module ($p_{th}$=0.02), i.e. all ads below the threshold value are filtered by the AQF module. Lastly, in some embodiments, a blacklist B is maintained of ads that are explicitly prohibited from exploration. This blacklist corresponds to known undesirable ads that cause a poor user experience.

One main mechanism that facilitates exploration is boosting of the predicted click probability. The formula for boosting is inspired by the UCB algorithm. Intuitively, the variance of the predicted click probability is assumed to behave as $$\alpha \frac{p(1-p)}{n},$$

where n is the number of samples. Assuming 1−p≈1, the upper confidence bound assumes the above form. In the boosting formula, α is a parameter to be tuned, it may be selected to ensure that more than 80% of explored ads would clear the AQF threshold. The quantity β is also a tuning parameter and is in place to ensure that when the number of impressions is zero, the boost factor remains bounded.

In some embodiments, only some of the cold ads are boosted. The warm ads are never boosted and this amounts to an assumption that the uncertainty in the estimate is essentially zero. Note also that the above approach of boosting is contextual because it uses the predicted click probability $p_i$ in the boost function, which in turn depends on the feature vector $f(q,a_i,u)$.

One significant difference between exploration in search advertising as opposed to the conventional multi-armed bandit problems (e.g. recommending news articles) is the presence of the auction. In the search advertising context, pulling an arm is tantamount to boosting the predicted CTR for the corresponding ad. After boosting, the ad will still compete in an auction, and will translate into an impression only when its rank-score (product of bid and predicted CTR) is high enough to win in the auction. Thus, unlike the traditional multi-armed bandit setting, pulling an arm, or boosting, is not guaranteed to produce an impression and thus does not necessarily provide information from which the click model can learn. As described below, measuring whether the click model actually learns is an important success criterion for the exploration design.

A large number of ads may be returned by matching for a given query session. From a bandit viewpoint, the ads returned are the arms. Since only a small number of ads may be displayed on a page, boosting too many ads may displace all of the legitimate high-quality ads from the exploration and thereby negatively impact either advertiser revenue, user-experience, or both. The maximum number of arms that may be pulled $r_{max}$ may be fixed up-front. In one example embodiment, $r_{max}$=2. This may be referred to as bid-proportional sampling.

In certain situations, the number of ads that are eligible for exploration may be smaller than $r_{max}$, in which case an embodiment will explore all the eligible ads. However, in most situations, the number of eligible ads returned is larger, and the system must decide which ads to explore, i.e. boost. While randomly choosing, with equal probability, is a natural approach, it has been found that sampling proportional to the bid to be quite effective. This approach has multiple advantages. The first advantage is that by boosting high bid ads, we increase the likelihood that the boosted ads win a page slot in the auction. The second advantage is that biasing the sampling toward the high bid ads keeps the price-per-click (PPC) of the auction high, thereby guarding against a revenue loss. Third, this provides a lever for advertisers with cold ads in the system to increase their volume. They can get higher impression share by simply increasing their bids One important part of some embodiments is a feature data logging. A detailed record of every impression and click may be kept in a data feed. Due to serving latency constraints, only the impressed ads are logged. Importantly, these impressions become part of both the click feedback EC/COEC features (which are updated) and also the training data for the next iteration of model update. This is essentially how learning is achieved from exploration. Ads that competed in auctions for page views, but were not impressed are not logged. Understanding the performance of exploration relies on these competing ads. Hence, a special logging mechanism may be enabled, for example, in the ad server 108 of FIG. 1, for the exploration bucket that logged all ads that were returned by the matching module to the click model. Information of this nature may be helpful to gain insights such as FIG. 2. Such insights, in turn, may be helpful in designing and tuning the exploration parameters.

One interesting observation related to design and evaluation was that, while there was found to be a high volume of cold ads, a number of these were not persistent. That is, these ads were not consistently returned by matching for competing in the auction (over multiple instances of the same query).

Figure 4:
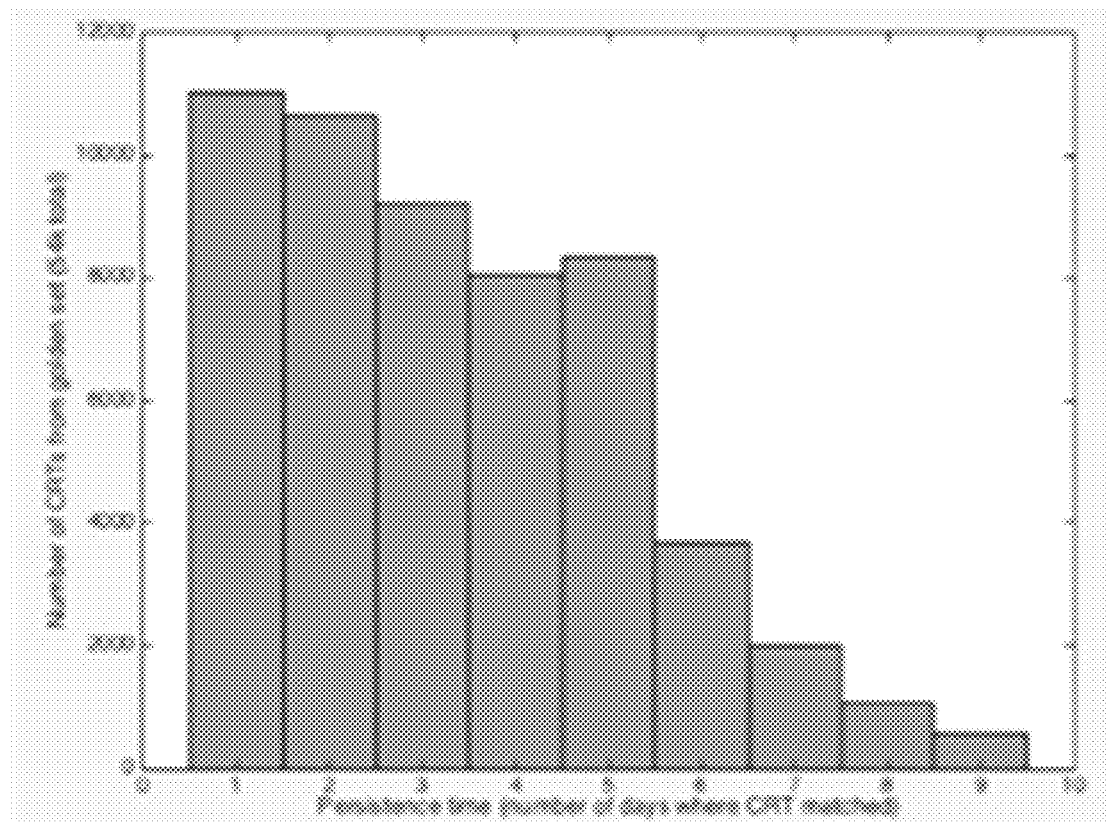
FIG. 4 is a histogram for the persistence of the ads returned in an experimental operation of a system in accordance with some aspects of the invention.

FIG. 4 is a histogram for the persistence of the ads returned in a nine day experiment. Each bar shows the number of cold ads (in bucket) that were returned by matching at least once on the corresponding (x-axis) number of days. The plot demonstrates that a large fraction of cold ads is not persistent. That is, they appear only once in a nine-day time window, and do not appear again. Such non-persistent ads cannot be learnt, and are ignored from the subsequent learning rate analysis.

This type of behavior can occur due to budget constraints imposed by the advertisers on their campaigns, or the inherent randomness in the matching algorithms themselves. Learning click probabilities for ads that are not persistent is much harder, and limits the efficacy of exploration. It is desirable to focus exploration only on persistent ads. It has been found that bid proportional sampling helped bias the exploration toward persistent ads.

To evaluate the design of the exploration scheme described above, a bucket experiment was performed. The test bucket was instrumented with a special form of logging. For each query session, not only were impressions logged, but also all the ads that were returned by matching but not impressed. Other relevant information was returned, such as the ads' click probabilities, boost factors, bids, etc.

The evaluation process involved understanding three different kinds of metrics. The first metric corresponds to understanding the effect of exploration on the click model features. This can influence the accuracy of the model on cold ads. This may be referred to as the learning rate. The second metric involved understanding the impact on the usual business metrics. Finally, a measure of whether or not the ads explored were "good" versus "bad" was explored. These qualitative notions are described in detail below. Evaluations of these metrics are described in detail in the sections below.

Learning Rate Metrics

A widely used metric that characterizes learning achieved by exploration is the notion of regret. In the regret framework, the problem of learning click probabilities may be viewed as an online learning problem where some loss function, such as revenue or clicks, must be optimized in an online manner. The performance of any given online algorithm may be compared with the performance of a hypothetical decision maker with perfect hindsight information. The difference between the optimum achieved between the two is called the regret, which can be analytically characterized, and quality of an algorithm is characterized by how low its regret is.

One drawback of regret as a solution-concept is that it is largely counterfactual in nature. Since the hypothetical decision-maker can never be realized, the regret cannot be explicitly measured in a bucket experiment, and it is difficult to justify from a business standpoint. Accordingly, an alternate solution concept that is more closely tied to the product viewpoint may be used instead of regret.

To arrive at the notion of "learning," it is noted that the click model uses logistic regression on a set of features. To predict accurately, the weights must be correctly identified. The most important feature that determines the accuracy of the prediction is the CRTEC, i.e. the number of times a particular creative has been seen historically on the training data. This is illustrated, for example, in FIG. 3. Hence, to predict accurately for a given cold ad, exploration must achieve enough impressions so that its click probability is accurately learned.

More concretely, let C be a set of cold ads, represented as creative identifiers, fixed on day 0 of the experiment. Let c $\Box$ C be a fixed creative, and let $n_c(t)$ be the number of impressions of c on day t of the experiment. Let N0 denote the coldness threshold, i.e. the threshold above which ads are considered warm. The fraction of creatives that remain cold at day t is then defined as $$(t) := \frac{\sum_{c \in C} 1(n_c(t) < N_0)}{|C|},$$

where $1(\cdot)$ denotes the indicator function. The relation f(t) may be used as the learning rate metric to track. A faster decay of f(t) indicates that more ads have become warm and hence the click prediction should be more accurate.

Figure 5:
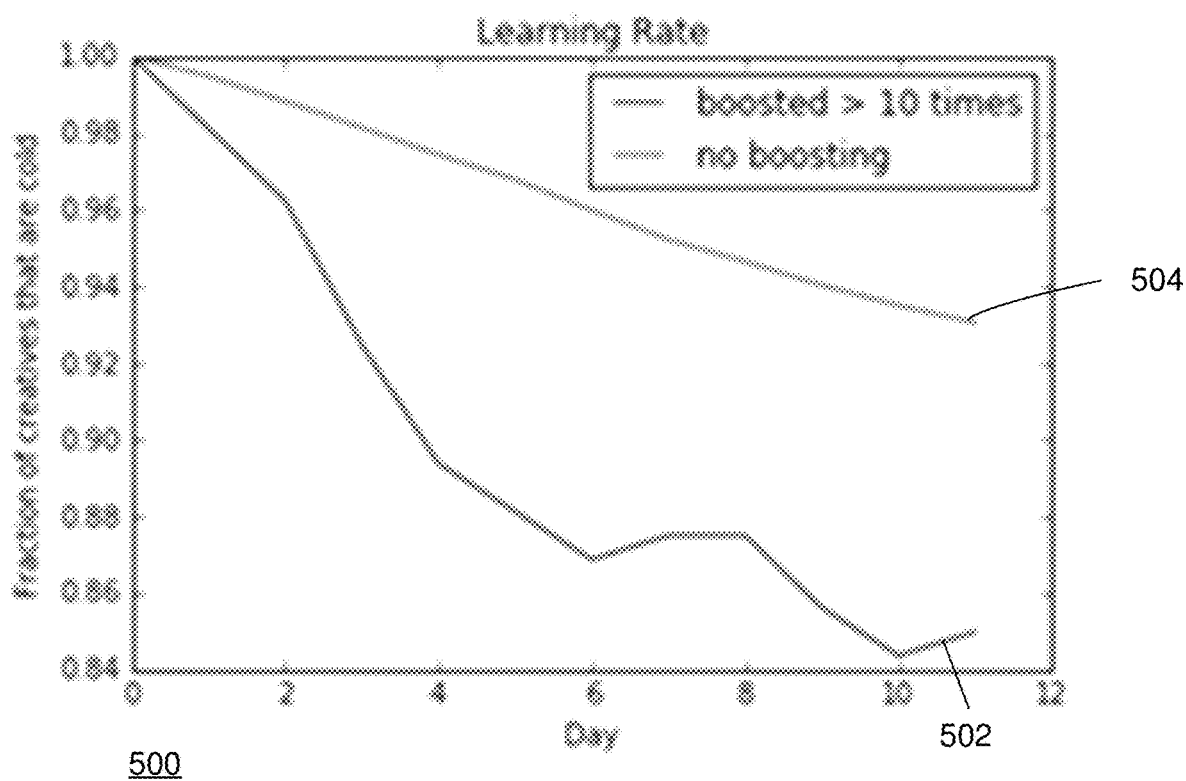
FIG. 5 is a plot showing the learning rate achieved for a pool of cold, persistent ads over an eleven day experiment.

FIG. 5 is a plot 500 showing learning rate achieved for a pool of cold, persistent ads over an eleven day experiment. The plot 500 includes learning rate 502 for boosted ads and learning rate 504 for ads which were not boosted. The plot of FIG. 5 shows that boosted ads become warm at a faster rate, hence resulting in faster learning. In FIG. 5, for a fixed set of creatives, the learning rate plot is shown with and without exploration.

Business Rate Metrics

The standard business metrics of interest are mentioned below. The role of each metric is explained, along with the bucket metric for traffic on tablet devices. Performance on desktop devices was found to be directionally similar.

Revenue-Per-Mille (RPM): This is the revenue generated per thousand impressions. In one embodiment, the RPM for the experimental case was +1% as compared to the control bucket.

Price-Per-Click (PPC): This is the price per click as determined by the auction. In one embodiment, the PPC for the test case was +0.5% as compared to the control bucket.

Click-Through Rate (CTR): This is the number of clicks per unit of impression (normalized by position) in the north section of the page. The north section of a page is the upper portion of a page as the page is rendered in a user device such as a table or mobile phone. In one embodiment, the CTR for the experimental case was found to be +0.04% as compared to control.

Click Yield (CY): The click yield is the number of ad clicks per total number of searches. The click yield was found to be +0.5% for the experimental case compared to control.

North footprint (NFP). This corresponds to the number of north ads shown per total number of searches. In one embodiment, the NFP was found to be +0.2% for the experimental case. The objective is to achieve positive metrics for all the above quantities while keeping NFP as neutral as possible.

The exploration design was able to demonstrate learning, in the sense explained above, while maintaining the above revenue and user engagement metrics neutral, and the experiment was thus concluded successfully.

Good v. Bad Ads

In addition to the learning-rate metrics and the business metrics that were used for the evaluation of the bucket experiments, the evaluation also sought to understand whether exploration was able to discover new ads of high-quality. This question was evaluated by investigating the set of ads that were explored over a larger volume of traffic.

To define this notion more formally, a cold ad a, may be fixed on day 0 of the evaluation. Let $pa_{,init}$ be the predicted CTR for the ad a, aggregated across all the different queries and users in which the ad is returned by matching on day 0. On day 0, because the ad a is cold, the empirical CTR of the ad is unknown. Assuming the ad is boosted and impressed a sufficient number of times in the next N days, the ad a will become warm, and its empirical CTR $pa_{,emp}$ is known.

For the purposes of exploration, define that a cold ad as "good" when $pa_{,emp}-pa_{,init}>\delta$. In other words, the CTR of the explored ad is higher than the predicted click probability of the ad pre-exploration, and hence exploration was able to discover a good ad. Conversely, define that an ad is bad when $pa_{,emp}-pa_{,init}<-\delta$. Set $\delta=0.001$, and, in 20 days of exploration data, for every creative that was persistent (appeared at least 100 times over multiple days), the following metrics are determined:

| Good Ads | Bad Ads | Neutral Ads |
|---|---|---|
| 9.5% | 85.9% | 4.6% |

Specifically, we found that, the exploration system explored a number of new ads, of which 9.5% were found to be good—i.e. these were ads with higher than expected click-through-rate, which would have been otherwise discarded by the advertising system. It is proposed to track good vs. bad ads as a novel, useful, and practical measure of evaluation for an exploration system.

Figure 6:
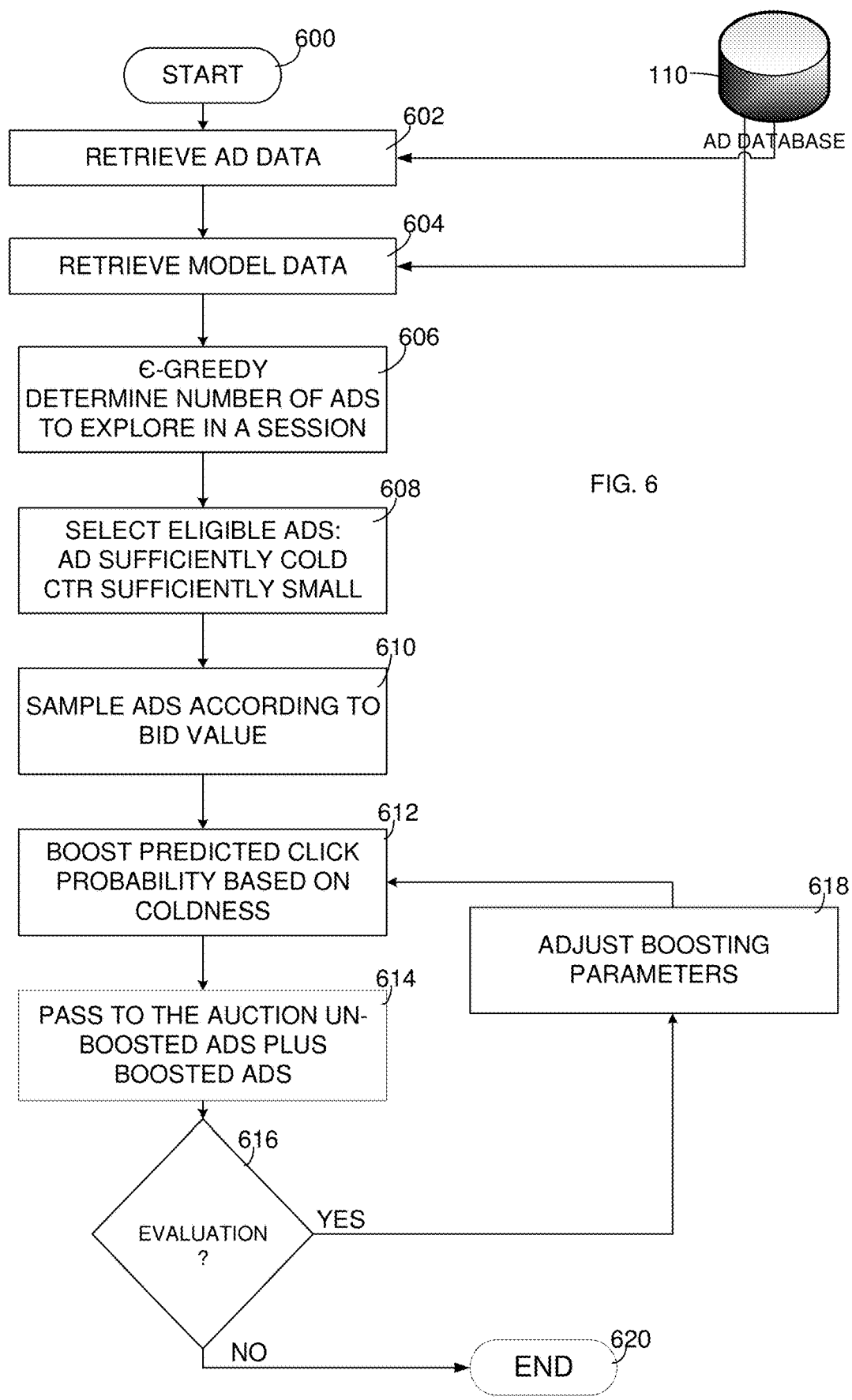
FIG. 6 is a flow diagram illustrating one exemplary embodiment of a method for exploring cold ads in an online advertising system.

FIG. 6 is a flow diagram illustrating one exemplary embodiment of a method for exploring cold ads in an online advertising system. The method begins at block 600. The method may be performed by any suitable computer or data processing system. In one example, the method steps of FIG. 6 may be performed by a server such as the ad server 108 of the online information system 100 of FIG. 2. The ad server or other computer system may be adapted to access one or more databases or other sources of information, such as ad database 110. The stored information may include ad data such as information about advertisements, respective historical information for the respective advertisements such as number of impressions or clicks received by a respective advertisement, if any, and other information. The stored information may further include click model information defining one or more click models for advertisements in an online marketplace. The click model may include code and data defining an analytical process for reporting an estimate of the probability of a click for an ad a, in the context of a query q by a user u. Generally, each respective variable a, q and u includes a variety of respective data. The respective data for the respective variable may be dynamic over time as new ads, queries and users are processed by the online information system.

At block 602, the method includes retrieving ad data and, at block 604, the method includes retrieving click model data. In one example, retrieving ad data includes retrieving as an input data including a query q, user u, ads $a_1, \ldots, a_m$, their corresponding click probabilities $p_1, \ldots, p_m$, their bids $b1, \ldots, b_m$, and their historical (position-normalized) impression counts $n_1, \ldots, n_m$, and a blacklist of ads B. Such ad data may be collected over time by the ad server 108 and stored in any suitable form in the ad database 110. In some embodiments, the ad data may be directly stored in the ad database 110 by an individual or entity. For example, advertisers managing their advertisements in the online information system may directly store their ad creatives and bid values and other ad information in the ad database. Other ad data may be stored in the ad database as a result of processing by some data processing system such as the ad server 108. For example, click probabilities may be calculated based on past performance by the ad server. For some ads, known as cold ads, there may be little or no historical information on which a click probability may be based. The method illustrated in FIG. 6 is particularly useful in selecting ads to provide to a user in response to a query when some of the ads are cold ads with little or no experience in the online information system.

The click model data may include code and data defining a particular click model to use to determine an estimate of click probability. The code may be instructions and other information to cause the ad server or other data processing system to analyze existing or retrieved data to determine the click probability. The data supporting the click model may include parameters such as $\epsilon$, the greed parameter; eligibility thresholds $p_{th}$, $n_{th}$ for the probability and coldness; $r_{max}$ the maximum number of arms that can be pulled in a single round of exploration, and boosting parameters $\alpha,\beta$. Other parameters and other click model data may be retrieved at this time as well.

At block 606, the mode determines the number of ads to explore in a session. In one embodiment, a session is set a period of time when a user access as web site and submits queries to the website to retrieve results. A session begins when the user opens the web page of the web site. The session ends when the user clicks on a link in an ad or content item and navigates away from the web site. A session may be determined in other ways, as well, using any convenient starting and ending points.

The greed parameter, $\epsilon$, may be used to control the number of ads explored for a session. In some embodiments, the value of $\epsilon$ may be set relatively low, close to 0, such as 0.05, so as to limit the number of cold ads explored in a given session. The value selected for $\epsilon$ reflects the tradeoff between more exploration, which can result in lost revenue, and less exploration, which tends to freeze out cold ads. If no ads are selected for exploration, a set F is returned including only ads with sufficient exposure or warmth and their existing click probabilities, and no cold ads for exploration.

At block 608, eligible ads are selected for possible exploration. Not all ads are made eligible for exploration. Ads that have sufficient historical impression volume have a reliable click through rate and are considered warm ads. There is no need to explore warm ads. In accordance with some embodiments, ads are selected as eligible based on their number of impressions and their click through rate estimate. A threshold for number of thresholds may be set. For example, only ads having fewer than $n_{th}=500$ impressions may be considered eligible for exploration. Similarly, a CTR probability threshold may be set as well. For example, the CTR probability threshold may be set at a value such as $p_{th}=0.02$. Ads below this threshold are considered ineligible for exploration. In addition, some ads may be considered ineligible as being blacklisted ads, such as ads which are known to cause a poor use experience.

At block 610, a process of bid-proportional sampling is applied to the eligible ads. When a query q is received from a user u, the online information system seeks to match that query to one or more ads. For example, each ad may have an associated keyword which is matched to one or more keywords in the query q. According to the bandit model, the matching ads returned are equal to the number of arms to be pulled. In some embodiments, the number of arms that may be pulled $r_{max}$ is fixed at a value such $r_{max}$=2. In some examples, the number of ads for exploration that are matched is below $r_{max}$, so all eligible ads may be explored. However, in most cases, the number of ads to be explored is limited by $r_{max}$.

The ads to be explored may be chosen randomly. However, in some embodiments, sampling ads according to bid amount may produce benefits. First, boosting high-bid ads increases the likelihood that a boosted ad will win a page slot in the auction. Second, biasing the sampling of ads toward the high bid ads keeps the price-per-click (PPC) of the auction high, helping to limit revenue loss due to the exploration process. Third, this allows advertisers with cold ads to collect impressions for their ads. They can control the volume of impressions their ads receive by increasing the respective bids of respective ads.

At block 612, predicted click probability is boosted for cold ads based on their coldness. This is a key feature to permit exploration of cold ads. In one example, boosting is done according to the relation $$\overline{p}_j := p_j \left(1 + \frac{\alpha}{\sqrt{\beta + n_j}}\right).$$

This represents a transformation of the nominal click through rate p that the system predicts. Boosting an ad gives the ad a higher chance of participating in the auction on a page to perform the exploration. The boosting formula operates to multiply the nominal click through rate by a number that is greater than 1. Example boost values may be 1.5 or 2.0 or 3.0, but any suitable value may be used to increase the boosted ad's chances in the auction. The boosting value $$\left(1 + \frac{\alpha}{\sqrt{\beta + n_j}}\right)$$

is biased to give a greater boost to a completely cold ad than to an ad which has been seen before. That is, the boosting value is biased to give a greater boost to an ad having relatively fewer impressions than to an ad which relatively more impressions. The value $n_j$ in the radical in the denominator is the number of impressions an ad has already been given and is part of the ad data retrieved at block 602. The online information system 100 tracks the number of an impressions an ad receives, for example, by incrementing a counter each time an ad is impressed. The amount of boost given to an ad's nominal click through rate is inversely proportional to the number of impressions the ad has received. Thus, the boosting value operates to control coldness versus how much boosting is done to the nominal click through rate.

The boosting parameters $\alpha$, $\beta$ are part of the click model parameters retrieved at block 604. The boosting parameters $\alpha$, $\beta$ may be determined in any suitable fashion. In one example, they may be estimated empirically. For example, offline experiments may be performed to determine an amount of revenue loss will be experienced for particular values of $\alpha$, $\beta$ versus whether the particular value of $\alpha$, $\beta$ will give enough exploration for an ad. Given the tradeoff required when exploring an ad while the online information system is actively processing live queries, it is desirable to minimize revenue loss while maximizing the amount of exploration. The boosting parameters $\alpha$, $\beta$ may be modified or tuned based on success of the exploration process. For example, in one embodiment, $\alpha$ is chosen to ensure that more than 80% of ads selected as being eligible exceed the probability threshold $p_{th}$. $\beta$ may be selected to ensure that even if an ad has zero impressions, the boost factor remains bounded.

At block 614, the ad server passes to the auction a set of ads including both boosted and unboosted ads. Only some of the cold ads are boosted. Warm ads are never boosted, where warm ads are defined by the impression ratio $n_{th}$. The boost function uses the predicted click probability $p_j$ for the boosted ads. The predicted click probability $p_j$, in turn, depends on the feature vector f(q, $a_j$, u).

In some embodiments, blocks 612, 614 and 616 implement a feedback loop to enable tuning the boosting parameters $\alpha$, $\beta$. In one embodiment, a good ad versus bad ad ratio may be evaluated as a measure of performance of the exploration system. In another embodiment, a learning rate may be evaluated as the measure of performance. These are exemplary only, and other evaluations may be substituted or combined to evaluate performance of the exploration process and to tune parameters of the click model.

In determining a good ad versus bad ad ration, following a session, ads may be classified as good ads or bad ads. To evaluate the good versus bad ad ratio, the exploration system is deployed on live traffic, processing received queries and exploring ads where possible. Of the set of ads that were explored, it is determined how often were good ads discovered and how often were bad ads discovered. An ad is considered a good ad if, after the session, its click through rate (CTR) is higher than the click model predicted, using the analysis described above. Conversely, an ad is considered a bad ad if, after the session, its click through rate is lower than the click model predicted. The ratio of good ads to bad ads is a quantity of interest. It should be larger than zero, but it may be set as a target at any amount, such as 5% or 10%. The good ad to bad ad ratio may be presented as a success criterion.

At block 614, following a session or a number of sessions, cold ads which were provided to the auction are evaluated as good ads or bad ads. A ratio of good ads to bad ads is developed and used to determine if the boosting parameters $\alpha$, $\beta$ should be adjusted. For example, a threshold value such as 2.0 could be set and the good ad/bad ad ratio compared with this threshold. If the ratio is below the threshold, the feedback loop indicates that the boosting parameters $\alpha$, $\beta$ should be tuned. The tuning may be an on-going process over time.

Another evaluation technique may be referred to as the learning rate. Relative learning rates for two different examples are illustrated in FIG. 5. Starting with a pool of cold ads, one subset of the pool of cold ads is explored and another subset of the pool of cold ads is not explored. FIG. 5 shows on the ordinate the fraction of ads or creatives that are cold. Moving left to right over time, the ads in each subset become warmer. The downward slope of each line in FIG. 5 corresponds to the learning rate. It is desired that the rate at which explored ads are becoming warm is faster. FIG. 5 includes learning rate 502 for boosted ads and learning rate 504 for ads which were not boosted.

In an alternative embodiment, in FIG. 6 the step of evaluating the evaluation operation at block 616 may be replaced with a step of evaluating the learning rate. After exploring a set of ads over a predetermined time period, the learning rate may be evaluated, as in FIG. 5. The current learning rate may be compared with a threshold learning rate. If the current learning rate exceeds the threshold, the values of the boosting parameters $\alpha,\beta$ may be maintained unchanged or may be adjusted to reduce the amount of exploration and thereby reduce revenue loss. Alternatively, if the current learning rate is less than the threshold, the values of the boosting parameters $\alpha$, $\beta$ may be increased or otherwise adjusted to increase the amount of exploration and thereby increase the learning rate.

Including the evaluation operation of block 616 creates a closed-loop process allowing the results of the ad exploration process to be used as feedback to tailor parameters of the click model, such as the boosting parameters $\alpha$, $\beta$. Closed-loop control may reduce errors and produce more efficient operation of the computer system which implements the online information system. This can improve operational stability and predictability of operation. Accordingly, using processing circuitry to implement closed loop control in the manner illustrated in FIG. 6 and described herein may improve the operation of the underlying hardware of the system. Hence, systems implementing closed loop control with processing circuitry in evaluating advertisements served over networks offer improvements over existing market solutions.

One significant advantage provided by the disclosed system and method is limitation of lost revenue to advertisers and the operator of the content delivery system. Typically, when an advertisement is boosted in the manner described herein, there is a risk of losing revenue. That is because, by inflating the advertisements click estimate, the advertisement will not get as many clicks as the inflated estimate, and it quite possibly displaced a non-boosted ad that would have gotten more clicks. The disclosed system and method achieve exploration by boosting, to improve accuracy of click probability for cold ads, substantially without losing revenue for advertisers or the content delivery system.

The disclosed system and method for exploration of cold ads improve the functioning of the underlying computer hardware itself. That is, these features, among others described here, are specific improvements in the way that the underlying computer system operates. The improvements facilitate more efficient, accurate, consistent and precise operation of the computer hardware in responding to queries received from users and serving advertisements to the users. Advertisements which are cold or cool, and with which the computer system has no experience, may be served on a sampling or exploring basis to develop some history with the ads. This may be done in such a way as to minimize the effect on revenue generated by an online system which charges advertisers for placing ads on web pages. While revenue and ad placement are economic concepts, they serve as a useful proxy for measuring the technical performance of the disclosed system. That is, in a system which is live and actively serving ads on web pages and collecting revenue, a goal is to minimize any reduction in revenue due to exploring ads. In such a case, the reduction in revenue is actually a figure of merit, a useful parameter for evaluating degree of success of the disclosed method.

While various embodiments and examples have been described herein with respect to an advertiser, it is to be understood that other individuals or entities may be acting in the place of an advertiser. For example, some businesses and other organizations engage advertising consultants, advertising agencies, search engine optimizers or other third parties to manage online advertising efforts. When the term "advertiser" is used herein, it is to be understood that this term is to apply equally to any third party acting in the place of an actual prospective advertiser or on behalf of an actual prospective advertiser. Information sent to a third party in connection with an advertiser's account or advertisements, or information received from a third party in connection with the advertiser's account or advertisements, may be considered as going to or coming from the advertiser.

In some embodiments described above, the online provider introduces a new advertising product and reaches out to a prospective advertiser by sending a communication such as an email message offering terms for a new advertising campaign using the new product. In another embodiment, the online provider may introduce the new product and offer the campaign in a similar manner to existing advertisers who use other advertising products. For example, some products offer a user interface by which an existing advertiser can monitor the progress and status of the advertising campaign. The online provider may choose to offer the new product through the user interface when the existing advertiser views the user interface. Instead of an email message sent to the advertiser, a message may be created and passed through the user interface. The message may include the same or similar content as the emails and other communications outlined above but in a different format for an existing advertiser accessing his account information.

The disclosed method and system may be implemented partly in a server, a client device, a cloud computing environment, partially in a server and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this invention.

The invention claimed is:

1. A method comprising:
    receiving a query at an online information system;
    in response to the query, retrieving from a database ad data about a plurality of ads available to place on a web page, at least some ads of the plurality of ads being cold ads, and model data;
    using the ad data and the model data in a click model, determining respective estimates of probabilities of a click for each respective ad if the ad is placed on the web page;
    filtering the plurality of ads according to the respective estimates of probabilities of a click and respective coldness data of each respective ad to produce a set of eligible ads;
    boosting the respective estimates of probabilities of a click for the set of eligible ads using boosting parameters to increase a likelihood of at least one eligible ad being included in an auction to place at least one ad on the web page;
    passing to the auction ads with boosted probability estimates and other ads;

performing the auction to select one or more ads to be placed on the web page;

based on results of the auction, placing the one or more ads on the web page;

evaluating success of boosted ads;

based on the evaluating, adjusting the boosting parameters for use when a next query is received to generate adjusted boosting parameters; and boosting one or more probabilities of one or more clicks using the adjusted boosting parameters, wherein the evaluating, the adjusting and the boosting one or more probabilities are at least part of a closed-loop process.

2. The method of claim 1 wherein evaluating success of the boosted ads comprises:

determining a learning rate for cold ads;

comparing the learning rate with a threshold;

wherein adjusting the boosting parameters comprises adjusting the boosting parameters when the learning rate does not exceed the threshold.

3. The method of claim 2 wherein determining the learning rate for cold ads comprises determining, for a set of cold ads, determining a fraction of the set of cold ads that remain cold after a predetermined amount of time.

4. The method of claim 3 wherein determining the fraction of the set of cold ads that remain cold comprises, for each respective cold ad of the set of cold ads, comparing number of impressions the respective cold ad has received with a coldness threshold.

5. The method of claim 1 wherein evaluating success of the boosted ads comprises:

passing one or more boosted ads to the auction a predetermined number of times;

comparing respective empirical probabilities of a click for the respective one or more boosted ads with respective initial estimates of probability of a click for the respective one or more boosted ads; and determining a ratio of number of ads whose respective empirical probabilities of a click exceeds the respective initial estimates of probability of a click by a predetermined threshold to number of ads whose respective empirical probabilities of a click does not exceed the respective initial estimates of probability of a click by the predetermined threshold;

wherein adjusting the boosting parameters comprises adjusting the boosting parameters when the ratio does not exceed a good ad versus bad ad threshold.

6. The method of claim 1 wherein retrieving from a database ad data about a plurality of ads available to place on a web page comprises:

identifying ads stored in an ad database having a keyword matching a keyword of the query; and identifying as cold ads at least some ads stored in the database and having an associated number of impressions less than a coldness threshold value.

7. The method of claim 1 wherein boosting the respective estimate of probabilities of a click for the set of eligible ads using boosting parameters comprises multiplying the respective estimate of probabilities of a click for the set of eligible ads by a boosting value greater than 1, the boosting value being biased to give a greater boost to an ad having relatively fewer impressions than to an ad which relatively more impressions.

8. The method of claim 1 further comprising from the set of eligible ads, selecting ads for boosting proportional to respective bid amount of each respective ad of the set of eligible ads, wherein the bid amount is among the ad data.

9. An ad server operable in an online information system, the ad server comprising:

a processor operable to execute software code; and software code stored on a computer-readable storage medium and operable to control the processor to:

receive over a network a query about information desired by an end user;

retrieve from an ad database ad data about ads matching the query and model data for a click model, the ad data including data defining respective ads, respective bid amounts for the respective ads, respective numbers of impressions received by the respective ads, and respective click probabilities, at least some of the respective ads being cold ads having numbers of impressions below a coldness threshold, the model data including boosting parameters for boosting the respective click probabilities of selected ads;

from the respective ads, selecting a set of eligible ads according to the respective click probabilities and the respective numbers of impressions, at least some ads of the set of eligible ads being cold ads;

using the boosting parameters, boosting the respective click probabilities of the cold ads of the set of eligible ads to increase a likelihood of the cold ads participating in an auction using the respective bid amounts to place one or more ads on a web page sent to the end user in response to the query;

evaluating progression of the cold ads from a cold state to a warm state over a time period;

based on the evaluating, adjusting the boosting parameters to generate adjusted boosting parameters; and boosting one or more probabilities of one or more clicks using the adjusted boosting parameters, wherein the evaluating, the adjusting and the boosting one or more probabilities are at least part of a closed-loop process.

10. The ad server of claim 9 wherein the software code stored on the computer-readable storage medium is operable to cause the processor to select for boosting a sample of ads of the set of eligible ads based on one or more respective bid amounts of the respective ads of the set of eligible ads.

11. The ad server of claim 10 wherein the software code stored on the computer-readable storage medium is operable to cause the processor to select for boosting ads having proportionately larger respective bid amounts to increase a likelihood that selected ads win the auction.

12. The ad server of claim 9 wherein the software code stored on the computer-readable storage medium is operable to cause the processor to evaluate progression of the cold ads from the cold state to the warm state over the time period by evaluating a learning rate for the cold ads over the time period and to adjust the boosting parameters when the learning rate does not exceed a threshold so that subsequently, ads are boosted so as to increase the learning rate.

13. The ad server of claim 9 wherein the software code stored on the computer-readable storage medium is operable to cause the processor to evaluate progression of the cold ads from the cold state to the warm state over the time period by determining a ratio of good ads to bad ads among one or more boosted ads, where a good ad is an ad whose respective empirical click probability has increased relative to the ad's respective initial click probability estimate by at least a predetermined amount, and a bad ad is an ad whose respective click probability has not increased relative to the ad's respective click probability estimate by the predetermined amount.

14. The ad server of claim 13 wherein the software code stored on the computer-readable storage medium is operable to cause the processor to retrieve from the ad database the respective click probability estimates among the ad data for the cold ads.

15. A method comprising:
in an online information system operable to select and provide ads in response to a query from an end user, the ads stored in an ad database and including at least some cold ads having a number of impressions less than a predetermined coldness threshold number of impressions,
retrieving from the ad database ad data about respective ads, the ad data including respective bid amounts, and respective number of impressions received by the respective ads and respective click probabilities, at least some of the respective ads being cold ads;
boosting respective click probabilities of the cold ads by a boosting value determined using variable boosting parameters;
performing an auction on a group of ads, including at least one cold ad having a boosted click probability, the auction being based at least in part on respective click probabilities of the respective ads of the group of ads; and
providing one or more ads, based on results of the auction, to the end user on a web page in response to the query.

16. The method of claim 15 further comprising:
evaluating results of the boosting to improve warmth of the cold ads over a period of time;
adjusting the variable boosting parameters based on the evaluating to generate adjusted variable boosting parameters; and
boosting one or more probabilities of one or more clicks using the adjusted variable boosting parameters, wherein the evaluating, the adjusting and the boosting one or more probabilities are at least part of a closed-loop process.

17. The method of claim 16 wherein evaluating comprises:
determining learning rate of a set of boosted ads over the period of time; and
comparing the learning rate with a learning threshold.

18. The method of claim 16 wherein evaluating comprises:
determining a ratio of good ads, having an empirical click probability that exceeds an initial estimated click probability by a predetermined amount, to bad ads, having an empirical click probability that does not exceed the initial estimated click probability by the predetermined amount; and
comparing the ratio to a threshold.

19. The method of claim 15 further comprising:
selecting as eligible ads only ads having a respective number of impressions less than a predetermined eligibility threshold and ads having a respective click probability exceeding a predetermined click through rate threshold;
wherein boosting the respective click probabilities comprises selectively boosting respective click probabilities of the eligible ads.

* * * * *